FIG. 2 SCANNING ELECTRON MICROGRAPHS OF POLYETHYLENE
FILM 100% STRETCHED IN BENZENE AT 25°C.
A
B
STRETCH DIRECTION
C
D
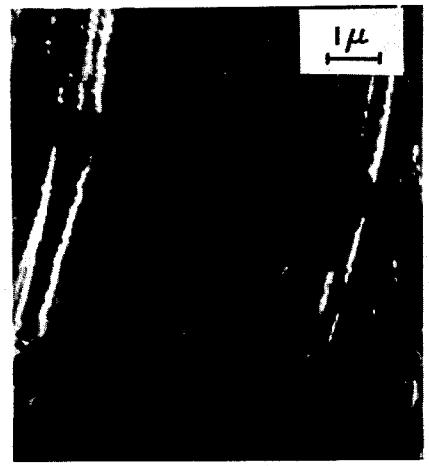

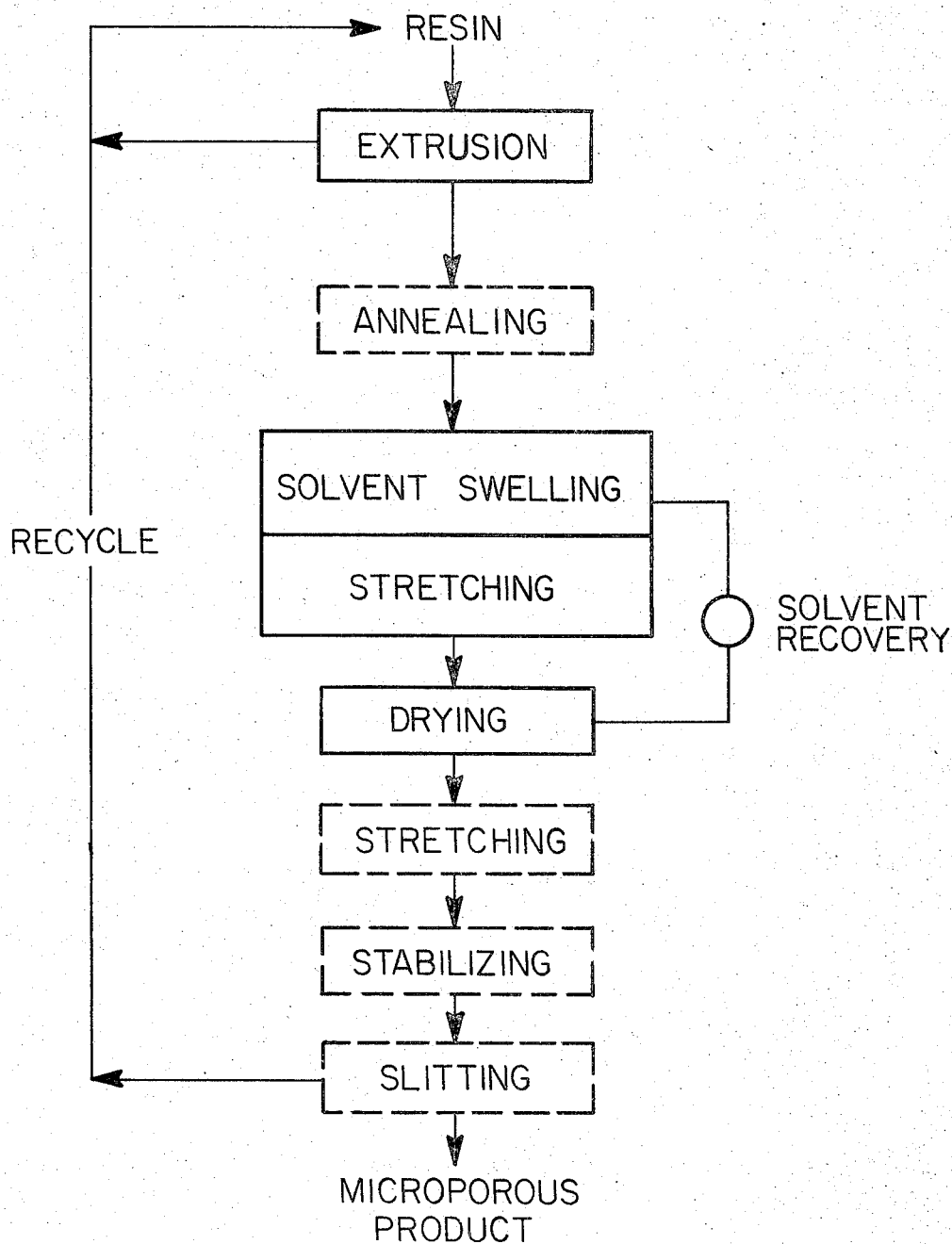

FIG. 3 SCANNING ELECTRON MICROGRAPHS OF POLYETHYLENE FILM 100% STRETCHED IN BENZENE AT 25° C AND THEN RESTRETCHED IN AIR TO A TOTAL OF 200%
A
B
STRETCH DIRECTION
C
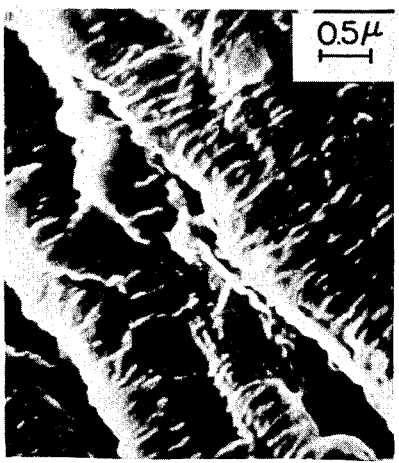
D

United States Patent Office 3,839,516
Patented Oct. 1, 1974

3,839,516
PROCESS FOR THE PREPARATION OF OPEN-CELLED MICROPOROUS FILMS
Joel Lawson Williams, Cary, and Heinz Gunther Olf and Anton Peterlin, Durham, N.C., assignors to Research Triangle Institute, Research Triangle Park, N.C.
Filed June 25, 1971, Ser. No. 156,711
Int. Cl. B29c 17/00, 25/00; B29d 27/00
U.S. Cl. 264—41                                    11 Claims

ABSTRACT OF THE DISCLOSURE

Open-celled microporous polymer films characterized by having a reduced bulk density but substantially the same tensile strength in each dimension as compared to the corresponding polymer films having no open-celled structure, a crystallinity of above about 30 percent, a pore size of less than 5000 Angstroms, and a nitrogen flux of greater than $$1 \times 10^{-5} \frac{\text{cm.}^3 \text{ (STP)} \cdot \text{cm.}}{\text{cm.}^2 \cdot \text{sec.} \cdot \text{cm. Hg}},$$

are prepared by the consecutive steps of:

I. contacting a polymeric film having at least two components, one of which is lesser in volume than all the other components, with a swelling agent for sufficient time to permit absorption of the swelling agent into the component of lesser volume,
II. then stretching the film in at least one direction while in contact with the swelling agent, and
III. maintaining the film in its stretched state during removal of the swelling agent. Optionally, the film is subsequently further stretched in one or more directions. Optionally stabilized by heat setting or ionizing radiation. The microporous films themselves.

BACKGROUND OF THE INVENTION

Field of the Invention

The present invention relates to a novel process for producing open-celled microporous films from synthetic resins or polymers.

Porous or cellular films can be classified into two general types: one type in which the pores are not interconnected, i.e., a closed-cell film, and the other type in which the pores are essentially interconnected through more or less tortuous paths which may extend from one exterior surface or surface region to another, i.e., an open-celled film. The porous films of the present invention are of the latter type.

Further, the pores of the product of the present invention are microscopic, i.e., the details of the pore configuration or arrangement are discernible only by microscopic examination. In fact, the open cells or pores in the films are smaller than those which can be measured using an ordinary light microscope, because the wavelength of visible light, which is about 5000 Angstroms (an Angstrom is one ten-billionth of a meter), is longer than the longest planar or surface dimension of the open cell or pore. The microporous films produced by the present invention may be identified, however, by using electron microscopy techniques which are capable of resolving details of pore structure below 5000 Angstroms.

The microporous films produced by the present invention are also characterized by a reduced bulk density, sometimes hereinafter referred to simply as a "low" density. The bulk density is also a measure of the increase in porosity of the films. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the Encylopedia of Chemical Technology, Vol. 4, page 892 (Interscience 1949). Other important characteristics of the films produced by the present invention reside in their high nitrogen flux, large surface area, increased flexibility, and substantial retention of tensile strength in each dimension, i.e., machine direction and transverse to that direction, all of which serve to distinguish the films from those of the prior art.

Summary of the Prior Art

Heretofore, films have been prepared from synthetic resins or polymers, e.g., polypropylene, by various melt extrusion or casting methods. Such films have many desirable properties such as high strength, and resistance to heat, light, and various chemicals.

For specific applications such as filter media and backings for breathable medical dressings or bandages, however, films having a porous structure in addition to their other properties are necessary or highly desirable.

U.S. Pats. 3,299,157 and 3,320,328 are concerned with the production of selectively permeable membranes for the separation of one isomer from a mixture of isomers. The pore size of those membranes differ from the pore size of the microporous films of this invention by orders of magnitude, the former are on the order of the diameters of the molecules they are used to separate, whereas the size of the pores of the latter range up to about 5000 A. The former membranes operate by a solution-diffusion transport process, in which the diffusion rate varies inversely as the square of the thickness. Thus, as the thickness increases the length of time required for an appreciable amount of the mixture to diffuse through the membrane becomes impractically long. Since the permeability is increased only a factor of 2 to 8 by treatment, little gain in diffusion rate occurs.

In contrast, the transport process for the microporous films of this invention is Knudsen diffusion where the diffusion rate varies inversely as the first-power of the thickness. Not only does this work to advantage in thicker membranes but the several order of magnitude increase in permeability means that appreciable material transport through the membrane occurs for membranes many times the thickness of the selectively permeable membrane of the art.

Thus, the question of thickness is the practical one of having a membrane thickness which can be useful in the practical case. If one must wait days for diffusion to occur rather than minutes or hours, the process is hardly useful.

Porous films have been produced which possess a microporous, open-celled structure, and which are also characterized by a reduced bulk density. Films possessing this microporous structure are described, for example, in U.S. Pat. 3,426,754. The preferred method of preparation described therein involves drawing or stretching at ambient temperatures, i.e., "cold drawing," a crystalline, elastic starting film in an amount of about 10 to 300% of its original length, with subsequent stabilization by heat setting of the drawn film under a tension such that the film is not free to shrink or can shrink only to a limited extent. However, the films of this patent are easily distinguished from those claimed herein due to the increased transverse tensile strength characteristics.

While the above described microporous or void-containing film of the prior art is useful, the search has continued for new processes able to produce open-celled microporous films having a greater number of pores, a more uniform pore concentration or distribution, a larger total pore area, and better thermal stability of the porous or voidy film. These properties are significant in applications such as filter media where a large number of uniformly distributed pores are necessary or highly desirable; and in applications such as breathable medical dressings subject to high temperatures, e.g., sterilization temperatures, where thermal stability is necessary or highly desirable.

SUMMARY OF THE INVENTION

Accordingly, an object of the present invention is to provide novel processes for producing microporous polymer films which have improved porosity and thermal stability so as to prevent or substantially alleviate the limitations or disadvantages of known porous or voidy polymer films of the prior art.

Another object of the present invention is to provide novel processes for producing open-celled microporous polymer films having improved porosity and stability.

Other advantages and further objects of the present invention will be apparent to those skilled in the art as the description thereof proceeds.

In accordance with the present invention, processes are provided for preparing open-celled microporous polymer films from non-porous, crystalline, polymer starting films. The process steps include:

I. contacting a polymeric film having at least two components, one of which is lesser in volume than all the other components, with a swelling agent for sufficient time to permit absorption of the swelling agent into the film, II. then stretching the film in at least one direction while in contact with swelling agent, and III. maintaining the film in its stretched state during removal of the swelling agent. Optionally, the film is subsequently further stretched in one or more directions. Optionally the film may be stabilized by heat-setting under tension or by ionizing radiation.

The resulting open-celled microporous polymer films are characterized by having a nitrogen flux of greater than about $$1 \times 10^{-5} \frac{cm.^3 \ (STP) \cdot cm.}{cm.^2 \cdot sec. \cdot cm. \ Hg},$$

a bulk density lower than the density of the polymeric starting material from which it is formed, a surface area of at least $10^3$ cm.$^2$/cm.$^3$; and tensile properties which remain high in both machine and transverse direction, i.e., no uniaxial strength properties resulting from the stretching process.

The film to be used in the process of this invention must contain at least two components, one of which has a greater affinity for the chosen swelling agent than the other component(s).

The mechanism of this process for the formation of highly permeable materials relies on the drawing of a bicomponent or multicomponent starting material in a swelling agent which has a preferential affinity for one of these components. However, unlike techniques where one component of a bi- or multicomponent material is dissolved out of a matrix to form pores, our process requires only that one component be mobilized (softened) by the swelling agent after which drawing and then drying under tension forms the pores. In our case, a much wider variety of swelling agents may be used since total solvency is not required. It should be noted that in our process all components are a part of the final material; i.e., there is no weight loss due to extraction as all components are chemically or mechanically connected. It is important that the drawing of the material occurs in the presence of the swelling agent and that the swelling agent is removed (usually by evaporation) while the material is held in the drawn condition.

As an example, crystalline materials which have both an amorphous component and a crystalline component lend themselves readily to this process. With such a parent material, the important part of the process is solvent drawing of the material; i.e., deformation of the material in the presence of a swelling agent, and removal of the swelling agent while the material is held in the drawn condition. The purpose of the swelling agent is to *preferentially mobilize the amorphous regions* in order to allow easy separation of the crystal lamella. Once the solvent drawing is complete, the sample must be allowed to dry under tension until the amorphous regions are immobilized and the fine pore structure, formed during solvent drawing, is preserved. The level of crystallinity is maintained throughout this solvent drawing process and only one component, the amorphous region, is mobilized. Furthermore, the process does not require that the material be capable of crystallizing, but only that one region or one of the components of the material should have a preferential affinity for the swelling agent. Crystalline materials are by nature two component and work well with this process. For that reason they are preferred. It is also preferred that the degree of crystallinity be at least about 30% by volume of the polymeric film.

Other bicomponent or multicomponent films which may be used include melt-blends of two or more polymers, at least one of which but not the major amount of the blend, is preferentially swollen by the chosen swelling agent. Examples of such melt-blends include blends of two or more of the following polymers: polyethylene, polypropylene, polyacrylonitrile, polystyrene, polyamides, polyesters, polyacetals, to name a few. Block copolymers are also useful in the process of this invention. With such copolymers the chosen swelling agent must preferentially swell at least one, but not the major amount, of the kinds of blocks in the copolymer. Examples of such block copolymers are: polystyrene-poly-2-vinylpyridine, polystyrene-polyacrylonitrile, polymethacrylate-polyvinylpyridine, and polypropylene-polymethacrylate, to name a few.

The starting film is preferably made from crystalline polymers such as polyethylene, polypropylene or oxymethylene polymers by melt extruding the polymer into film, and thereafter heating or annealing the oriented film if necessary to improve or enhance the initial crystallinity.

The essence of the present invention is the discovery that the stretching in at least one direction of the starting film into which a solvent has diffused, which solvent has a preferential affinity for one component in the film, and then removing the solvent from the film while the film is under tension, i.e. not allowed to return to its original relaxed dimensions, will impart to the film a unique open-celled structure which results in the above described advantageous properties.

As determined by various morphological techniques or tests such as electron microscopy, the microporous films of the present invention are characterized by a plurality of elongated, non-porous, interconnecting surface regions or areas. Substantially alternating with and defined by these non-porous surface regions are a plurality of elongated, porous surface regions which contain a plurality of fibrils or fibrous threads. These fibrils are connected at each of their ends to the non-porous regions. Between the fibrils are the pores or open cells of the films of the present invention. These surface pores or open cells are substantially interconnected through tortuous paths or passageways which extend from one surface region to an opposite surface area or region.

With such a defined or organized morphological structure, the films of the present invention have a greater proportion of surface area, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

Other aspects and advantages of the present invention will become apparent to one skilled in the art to which the present invention pertains from the following more detailed description of preferred embodiments when read in conjunction with the appended drawings.

The swelling agent should be such that it preferentially swells at least one of the minor components of the bicomponent or multicomponent film. For most polymers solvent stretching can be conducted by contact with any one of a number of suitable solvents.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

DESCRIPTION OF THE PREFERRED EMBODIMENTS

The microporous films of the present invention are preferably formed from a starting film of crystalline, film-forming, polymers.

These starting films must have a percent crystallinity of at least 30 percent, preferably at least 40 percent, and most preferably at least 50 percent, e.g., about 50 to 90 percent, or more. Percent crystallinity is determined by the X-ray method described by R. G. Quynn et al. in the *Journal of Applied Polymer Science*, Vol. 2, No. 5, pp. 166–173 (1959). For a detailed discussion of crystallinity and its significance in polymers, see *Polymers and Resins*, Golding (D. Van Nostrand, 1959).

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films should generally have a percent crystallinity of at least 30 percent, preferably at least 40 percent, and most preferably about 50 percent to 90 percent, or higher.

For example, a film-forming homopolymer of polyethylene or polypropylene may be employed. When polyethylene is used a linear polymer is preferred having a weight average molecular weight between 50,000 and 800,000 preferably between 50,000 and 500,000. When propylene homopolymers are contemplated, it is preferred to employ an isotatic polypropylene having a percent crystallinity as indicated above, a weight average molecular weight ranging from about 50,000 to 750,000 preferably about 200,000 to 500,000 and a melt index (ASTM-1958D–1238–57T, Part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, i.e., one which contains recurring oxymethylene, i.e., —$CH_2$—O—, units interspersed with —OR— groups in the main polymer chain where R is a divalent radical containing at least two carbon atoms directly linked to each other and positioned in the chain between the two valences, with any substituents on said R radical being inert, that is, which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. 3,027,352 of Walling et al. These polymers in film form may also have a crystallinity of at least 30 percent, preferably at least 40 percent, and most preferably at least 50 percent, e.g., 50 to 60 percent, or higher. Further, these polymers have a melting point of at least 150° C. and a number average molecular weight of at least 10,000. For a more detailed discussion of acetal and oxymethylene polymers, see, *Formaldehyde*, Walker, pp. 175–191, (Reinhold, 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, polypropylene terephthalate, polybutylene terephthalate, all of which are well known in the art and need not be described further herein for sake of brevity.

The types of apparatus suitable for forming the starting films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C. preferably 200° C. to 240° C. Polyethylene may be extruded at a melt temperature of about 175° to 225° C. while acetal polymers, e.g., those of the type disclosed in U.S. Pat. 3,027,352, may be extruded at a melt temperature of about 185° C. to 235° C. preferably 195° to 215° C.

The extrusion operation is preferably carried out with slow cooling in order to obtain maximum crystallinity. This may be accomplished by having the take-up roll relatively far from the extrusion slot.

While the above description has been directed to slit die extrusion methods, an alternative method of forming the starting films contemplated by this invention is the blown film extrusion method wherein a hopper and an extruder are employed which are substantially the same as in the slot extruder described above. From the extruder, the melt enters a die from which it is extruded through annular orifice to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide different cooling rates. Means such as a cooling mandrel may be used to cool the interior of the tubular film. After a distance during which the film is allowed to completely cool and harden, it is wound up on a take-up roll.

Optionally, the extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene, the preferred annealing temperature is about 100 to 155° C., while for oxymethylene (acetal) copolymers, the preferred annealing temperature is about 110 to 165° C.

General classes of swelling agents from which one appropriate for the particular polymeric film may be chosen are lower aliphatic alcohols such as ethanol, etc.; lower aliphatic ketones such as acetone, methyl ethyl-ketone cyclohexanone; lower aliphatic acid esters such as ethyl formate, butyl acetate, etc.; halogenated hydrocarbons such as carbon tetrachloride, trichlene, perchlene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

It is preferred that the swelling agents be a compound composed of carbon, hydrogen, oxygen, nitrogen, halogen, sulfur and contain up to about 20 carbon atoms, preferably up to about 10 carbon atoms.

This process is more specifically described hereinafter.

FIG. 1 shows a schematic flow sheet of a continuous process, including optional steps, for the production of the microporous films of this invention. The resin is extruded in the maner described herein; optionally and preferably annealed; swollen in contact with a swelling agent, preferably immersed therein; stretched while still in contact with the swelling agent; swelling agent removed, preferably by evaporation, while under tension, preferably at the same extension; optionally stretched further; optionally stabilized by heat-setting while under tension or by irradiation; optionally slitting; and finally taking up the product microporous film by conventional means, such as a driven roll; trimmings from the slitting step may be recycled as can the solvent, as indicated.

FIG. 2 shows electron photomicrographs of the indicated scale of the surface of the microporous polyethylene produced in Example 1.

FIG. 3 shows electron photomicrographs of the indicated scale of the surface of the restretched microporous polyethylene of Example 1.

In FIGS. 2 and 3 generally the dark areas aligned in the direction of the stretching are the pores and the lighter areas are the polymer.

Although a continuous process has been depicted in FIG. 1 and is, of course, preferred, the process can be operated batch-wise, as will be appreciated from the description and the Example.

The solvent stretching step may be conducted at a temperature in range from above the freezing point of the solvent, or swelling agent, to a point below the temperature at which the polymer dissolves. Ambient temperature to about 50° C. above.

The film employed in the process may be quite thick. In fact it is quite unusual that the process can be used to produce relatively thick microporous films. To our knowledge this is not possible with prior art processes; or if it is, only with great difficulty. The film to be used may range from 0.1 to about 250 mils, or even thicker. Any thickness will work if the solvent has penetrated the film or sheet.

The film may be solvent stretched to an extent at least 1% greater than its original length to about 400% more than its original length. It is preferred that the film be stretched at least about 50% to about 200% greater, preferably to about 100% greater than its original length. The stretching after the solvent-stretching step and solvent removal step may be to the extent of up to about 350% beyond the amount stretched in the solvent-stretching step. The preferred range is an additional 50–200% based on the original dimension of the starting film.

The optional stabilization step may be either a heat-setting step or a cross-linking step. This heat treatment may be carried out at a temperature in the range from about 125° C. up to less than the fusion temperature, and preferably about 130 to 160° C. for polypropylene; from about 80° C. up to less than fusion temperature, and preferably about 140 to 160° C., for acetal polymers; from about 75° C. up to less than fusion temperature, and preferably about 115 to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out suquentially with and after the drawing operation, shouldn't be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon. The after-stretching just described is what is termed "cold stretching" and is defined as stretching or drawing a film to greater than its original length and at a stretching temperature, i.e., the temperature of the film being stretched, less than the temperature at which melting begins when the film is uniformly heated from a temperature of 25° C. and at a rate of 20° C. per minute.

The invention is further illustrated by the following examples.

EXAMPLE 1

Polyethylene (Fortiflex A-60-500) with $\bar{M}_n = 5{,}500$ and $\bar{M}_w = 80{,}000$ was compression molded (0.1 mm. thick) at 150° C. and allowed to slowly cool. This sample was immersed overnight in benzene and subsequently stretched in benzene at a rate of 0.5 mm./min. to double its initial length. The benzene was then removed by evaporation and the sample allowed to dry in air in the stretched state. Within a minute the sample was opaque which is indicative of micropores. All of the stretching and drying were carried out at 25° C. After drying, permeability measurements were carried out. The 100% solvent stretched sample had a permeability constant for nitrogen of $880{,}000 \times 10^{-10}$ $$\left( \frac{cm.^3 \; (STP) \cdot cm.}{cm.^2 \cdot sec. \cdot cm. \; Hg} \right)$$

compared to $1.1 \times 10^{-10}$ for the undrawn material, a 800,000-fold increase in permeability. More detailed information on this 100% benzene stretched sample is given in our publication (Makromol. Chem. *135*, 41 (1970)).

Overnight immersion in benzene happened to be convenient but immersion for a much shorter time, e.g., a matter of minutes would be sufficient.

In this example $\bar{M}_n$ means number average molecular weight and $\bar{M}_w$ means weight average molecular weight.

EXAMPLE 2

A commercial film (1 mil thick) of extruded (flat film) polyethylene (Dylan type 7007, obtained from Koppers) was immersed in toluene (5 minutes) and stretched in the same fashion as given in Example 1. After air drying in the stretched state the sample had a permeability of $270,000 \times 10^{-10}$.

EXAMPLE 3

Samples of 1 mil extruded (flat film) polyethylene (Chemplex type 6108 obtained from Koppers) were immersed in various solvents as listed in Table I. These samples were then stretched 100% and air dried in the stretched state at 25° C. as described in Example 1. The transport of air was then measured and is tabulated in Table I.

TABLE I

Air transport properties of film samples that have been solvent stretched in liquids with different solubility parameters $$P \times 10^{10} \left( \frac{cm.^3 (STP) \cdot cm.}{cm.^2 \cdot sec. \cdot cm. Hg} \right)^b$$

| Liquid | Solubility parameter [a] | Polyethylene 100% [c] | Polyoxymethylene 80% [d] | Polypropylene 100% [e] |
|---|---|---|---|---|
| Hexane | 7.3 | 337,000 | | |
| Xylene | 8.8 | | | |
| Toluene | 8.9 | 207,000 | 600,000 | 90,000 |
| Benzene | 9.2 | | | |
| Acetone | 10.2 | 389,000 | | |
| Ethanol | 12.7 | 331,000 | | |

[a] $\left( \frac{\text{Energy of Vaporization}^{1/2}}{\text{Molar Volume}} \right)$ = Hildebrand Solubility Parameter.

[b] Permeability.
[c] See Example 3.
[d] See Example 4.
[e] See Example 5.

EXAMPLE 4

Polyoxymethylene (Celcon M-25-01 obtained from Celanese) was compression molded (0.1 mm. thick) at 200° C. and allowed to slowly cool. The sample was immersed in toluene for 30 minutes at 86° C. and stretched at 0.5 mm./min. to 80% extension. The sample was then removed and allowed to air dry at 25° C. in the stretched state. Upon drying the sample turned opaque indicative of micropores. The 80% solvent drawn polyoxymethylene had an air permeability constant of $600,000 \times 10^{-10}$ compared to $0.015 \times 10^{-10}$ for the undrawn polyoxymethylene. (See Table I.)

EXAMPLE 5

Polypropylene (Escon 502) was compression molded (0.1 mm. thick) at 150° C. and allowed to slowly cool. This film was then immersed in toluene overnight. The film was then stretched in toluene at 0.5 mm./min. to 100% of its initial length. The solvent was removed and the sample allowed to air dry at 25° C. in the stretched state. The sample turned opaque, indicative of micropores. The 100% solvent stretched polypropylene had an air permeability constant of $90,000 \times 10^{-10}$ compared to $0.4 \times 10^{-10}$ for the undrawn polypropylene. (See Table I.)

EXAMPLE 6

A 1 mil thick film of polyethylene (Chemplex type 6108) was solvent stretched in ethanol as described in Example 3 and air permeability measured. This sample was then restretched in air and the permeability of air examined at various extents of deformation. The influence of restretching on the high transport properties are summarized in Table II.

TABLE II

The influence of subsequent air stretching on the transport properties of air in a 1 mil thick film of polyethylene (Chemplex 6108) that had been initially solvent stretched 100% in ethanol. All at 25° C.

| Sample description | Total percent stretched | Penetrant | $P \times 10^{10} \left( \frac{cm.^3 (STP) \cdot cm.}{cm.^2 \cdot sec. \cdot cm. Hg} \right)$ [a] |
|---|---|---|---|
| Stretched in ethanol. | 100 | Air | 330,000 |
| Restretched in air | 120 | Air | 320,000 |
| Do | 168 | Air | 181,000 |

[a] Permeability.

EXAMPLE 7

The same as Example 6 except using acetone as the solvent. These results are presented in Table III.

TABLE III

The influence of subsequent air stretching on the transport properties of air in a 1 mil thick film of polyethylene (Chemplex 6108) that had been initially solvent stretched 100% in acetone. All at 25° C.

| Sample description | Total percent stretched | Penetrant | $P \times 10^{10} \left( \frac{cm.^3 (STP) \cdot cm.}{cm.^2 \cdot sec. \cdot cm. Hg} \right)$ [a] |
|---|---|---|---|
| Stretched in acetone. | 100 | Air | 378,000 |
| Restretched in air | 153 | Air | 259,000 |
| Do | 200 | Air | 160,000 |

[a] Permeability.

EXAMPLE 8

1 mil thick films of polyethylene (Chemplex 6108) were stretched in toluene to various extents and air dried under tension at 25° C. as described in Example 1. Air permeability was then measured as a function of stretching and the results are summarized in Table IV.

TABLE IV

The influence of stretching on the air transport properties of a 1 mil thick polyethylene stretched in toluene at 25° C.

| Sample number | Percent stretched $\left( \frac{L-L_0}{L} \cdot 100 \right)$ [a] | $P \times 10^{10} \left( \frac{cm.^3 (STP) \cdot cm.}{cm.^2 sec. \cdot cm. Hg} \right)$ [b] |
|---|---|---|
| A | 18 | 13,500 |
| B | 50 | 48,200 |
| C | 75 | 155,000 |
| D | 100 | 207,000 |
| E | 125 | 355,000 |

[a] $L$ = Final Length; $L_0$ = Original Length.
[b] Permeability.

EXAMPLE 9

Polyethylene film (80% drawn in toluene) prepared as in Example 1, polyoxymethylene prepared as in Example 8, and polypropylene prepared as in Example 7 were used for liquid transport measurement of toluene under one atmosphere pressure gradient at 25° C. These results are summarized in Table V. Under these conditions of measurement the transport of toluene in the undrawn materials was too slow to measure, i.e. less than $0.1 \times 10^{-3}$ cm.$^3$/cm.$^2 \cdot$min.

TABLE V

Liquid transport of toluene through various films at 25° C. All under one atmosphere pressure gradient and thickness of 0.1 mm.

| Sample number | Description | Percent drawn | Draw temp. | $P \times 10^3 \left( \frac{cm.^3 \text{ liq.}}{cm.^2 \cdot min.} \right)$ [a] |
|---|---|---|---|---|
| A | Polyethylene | 80 | 25° | 10.0 |
| B | Polyoxymethylene | 53 | 90° | 8.0 |
| C | do | 100 | 90° | 24.4 |
| D | Polypropylene | 50 | 25° | 1.2 |

[a] Permeability.

What is claimed is:

1. A process for the preparation of a microporous polymeric film comprising the steps of:
    contacting a polymeric film, said polymeric film comprising a crystalline polymer having both an amorphous and a crystalline component, said polymeric film selected from the group consisting of polyolefins, polyacetals, polyamides, polyesters, polyalkylene sulfides and polyarylene oxides, with a swelling agent, said swelling agent comprising a non-aqueous solvent having a Hildebrand solubility parameter at or near that of the polymeric film, for a time sufficient to permit absorption of the swelling agent into the film;
    stretching said film in at least one direction while in contact with said swelling agent; and
    removing said swelling agent from said film while maintaining said film in its stretched state.

2. The process of claim 1 wherein said stretching step is conducted at a temperature above the freezing point of said swelling agent but below the temperature at which said polymeric film dissolves in said swelling agent.

3. The process of claim 1 wherein said polymeric film is polyethylene.

4. The process of claim 1 wherein said polymeric film is polypropylene.

5. The process of claim 1 wherein said swelling agent is selected from the group consisting of lower aliphatic ketones, lower aliphatic acid esters, halogenated hydrocarbons, hydrocarbons, nitrogen-containing organic compounds, ethers, and mixtures of two or more of the above.

6. The process of claim 1 wherein said swelling agent has a Hildebrand solubility parameter in the range of between about 7.3 to 12.7.

7. The process of claim 1 wherein the crystallinity of the starting film is at least 50 percent.

8. The process of claim 1 wherein the film is stretched from about 50 percent to about 400 percent greater than its original length.

9. The process of claim 8 wherein the film is stretched from 50 percent to 200 percent greater than its original length.

10. The process of claim 9 wherein the swelling agent is removed by evaporation.

11. The process of claim 9 wherein the film is restretched after swelling agent removal to an additional extent of from 50 percent to 350 percent greater than its original length.

References Cited

UNITED STATES PATENTS

| | | | |
|---|---|---|---|
| 3,584,107 | 6/1971 | Kubitzek et al. | 264—288 |
| 3,102,323 | 9/1963 | Adams | 264—Dig. 8 |
| 3,320,328 | 5/1967 | Michaels | 264—343 X |
| 3,513,110 | 5/1970 | Noether | 264—290 R |
| 3,323,978 | 6/1967 | Rasmussen | 264—Dig. 8 |
| 2,956,308 | 10/1960 | Schulken et al. | 264—344 X |
| 3,539,374 | 11/1970 | Isaacson | 117—135.5 X |
| 3,426,754 | 2/1969 | Bierenbaum et al. | 264—Dig. 13 |
| 3,679,538 | 7/1972 | Druin et al. | 161—159 |

OTHER REFERENCES

DeCoste, J.B., F. S. Malm and V. T. Wallder: "Cracking of Stressed Polyethylene; Effect of Chemical Environment," In *Industrial and Engineering Chemistry*, vol. 43, No. 1, January 1951, pp. 117–121.

Howard, John B.: "A Review of Stress—Cracking in Polyethylene," *SPE Journal*, May 1959, pp. 397–412.

*Encyclopedia of Polymer Science and Technology*, vol. 7, New York, Interscience, © 1967, pp. 280–283, 290.

PHILIP E. ANDERSON, Primary Examiner

U.S. Cl. X.R.

126—156; 161—170, 402; 260—2.5 R, 2.5 HA, 2.5 F, 2.5 M, 2.5 N, 171, 288, 343, Dig. 8, Dig. 13, Dig. 47